United States Patent [19]

Iikura

[11] Patent Number: 4,573,727
[45] Date of Patent: Mar. 4, 1986

[54] ROBOT HAND

[75] Inventor: Shoichi Iikura, Yokohama, Japan

[73] Assignee: Kabushiki Kaisha Toshiba, Kawasaki, Japan

[21] Appl. No.: 652,591

[22] Filed: Sep. 20, 1984

[30] Foreign Application Priority Data

Mar. 31, 1984 [JP] Japan .................................. 59-63508

[51] Int. Cl.[4] ............................................ B25J 15/08
[52] U.S. Cl. .................... 294/115; 294/106; 901/31; 901/36
[58] Field of Search ................ 294/86.4, 88, 106, 115; 3/12.7; 74/89.11, 89.13; 269/225, 227; 901/31, 32, 36

[56] References Cited

U.S. PATENT DOCUMENTS

| | | | |
|---|---|---|---|
| 3,572,807 | 3/1971 | Haaker et al. | 294/106 |
| 3,866,966 | 2/1975 | Skinner | 294/106 |
| 3,904,234 | 9/1975 | Hill et al. | 294/106 |
| 4,351,553 | 9/1982 | Rovetta et al. | 294/106 |
| 4,377,305 | 3/1983 | Horvath | 294/106 |

FOREIGN PATENT DOCUMENTS

| | | | |
|---|---|---|---|
| 53357 | 4/1977 | Japan | 294/106 |
| 598749 | 3/1978 | U.S.S.R. | 901/36 |
| 627059 | 10/1978 | U.S.S.R. | 294/88 |

OTHER PUBLICATIONS

T. Mizutani, K. Hasegawa, "On Applications of Differential Gear Mechanism To Articulated Manipulator", J. of the JSPE, pp. 64–69, vol. 47, No. 11, 1981.

Primary Examiner—Johnny D. Cherry
Attorney, Agent, or Firm—Oblon, Fisher, Spivak, McClelland & Maier

[57] ABSTRACT

A robot hand comprises first and second parallel main shafts fixed to a pair of parallel support plates. First and second finger member-driving mechanisms are respectively provided on the first and second main shafts to face each other. The finger member-driving mechanism includes first and second bevel gears separately set and rotatably supported on the main shaft, an auxiliary shaft rotatably supported on the main shaft, and a third bevel gear supported on the auxiliary shaft to be rotated about an axis perpendicularly intersecting the main shaft and meshed with both first and second bevel gears. Finger members are fixed to the third bevel gears, so that the finger members may be rotated around the main shaft and auxiliary shaft by rotating the first and second bevel gears.

4 Claims, 6 Drawing Figures

ROBOT HAND

BACKGROUND OF THE INVENTION

This invention relates to a very useful robot hand of a simple construction which has a pair of finger members which can pinch and rotate.

In recent years, the application of robots has been widely accepted in various technical fields. One type of robot which is used advances a prescribed operation with a workpiece pinched between a pair of finger members. However, the conventional robot hand which simply pinches a workpiece between a pair of finger members, namely, whose paired finger members can only be pressed against or detached from a workpiece, is accompanied with the drawbacks that a limitation is imposed on its workability. Namely, it has been impossible for a robot to carry out the same delicate work as is realized by a human fingertip. Therefore, a robot hand which can be rotated like the human wrist has been contemplated. In this case, however, the pinching operation of the fingers of the robot hand and their rotation are independently carried out. Therefore, the proposed robot hand is still limited in workability. If a robot hand capable of the above-mentioned pinching operation and of rotating its fingers by means of a master-slave type manipulator is made available, there is still the problem that the operator will suffer from a heavy work load.

SUMMARY OF THE INVENTION

It is accordingly the object of this invention to provide a robot hand which enables a pair of finger members to be vertically rotated so as to be pressed together or separated from each other, and also to be horizontally rotated, thereby ensuring not only the pinching of a workpiece but also the handling of any other complicated work.

DETAILED DESCRIPTION OF THE PREFERRED EMBODIMENT

Figure 1A:
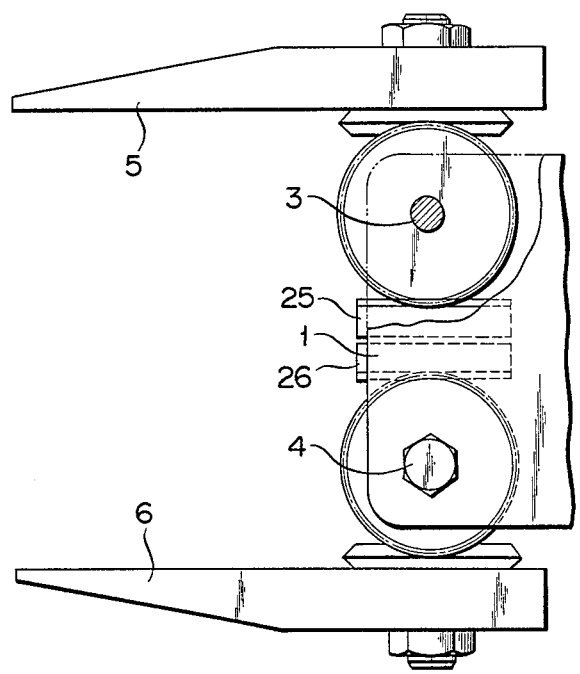
FIG. 1A is a plan view of a robot hand embodying this invention.
Figure 1B:
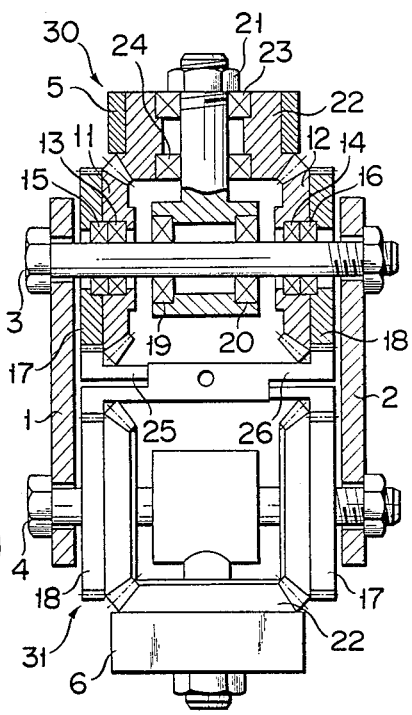
FIG. 1B is a side view of the same, in which the parts are sectioned.

A description may now be made with reference to the accompanying drawings of a robot hand embodying this invention.

Reference numerals 1, 2 denote a pair of horizontal, mutually facing support plates which constitute a robot hand body. A pair of horizontally extending main shafts 3, 4 spaced from each other at a prescribed distance traverse said pair of support plates 1, 2. Said main shafts 3, 4 are each constituted by a bolt, both ends of which penetrate holes formed in the support plates 1, 2. Each bolt is firmly fixed to the support plate by means of a head formed at one end and by a nut threaded with the other end. First and second finger members 5, 6 are rotatably supported on the main shafts 3, 4 by means of first and second finger member-driving mechanisms (gear mechanisms) 30, 31. These finger member-driving mechanisms 30, 31 face each other, and rotate about the main shafts 3, 4 thereby enabling the finger members 5, 6 to be rotated in the vertical plane or moved in the vertical direction (to pinch a workpiece) and also rotated in the horizontal plane or direction, that is, in the direction perpendicular to the direction in which said finger members are moved to pinch the workpiece.

A description may now be made of the finger member-driving mechanisms. Since these mechanisms have the same construction and perform the same function, a description will only be made of the first finger member-driving mechanism 30 pivotally supporting the first finger member 5. A description of the other finger-driving mechanism 31 will be omitted.

First and second mutually facing bevel gears 11, 12 are respectively supported on those portions of the main shaft 3 which lie near the support plates 1, 2. These bevel gears 11, 12 are rotated about the main shaft 3 by means of the corresponding bearings 13, 14. The bevel gears 11, 12 have the same diameter. Teeth are formed on the mutually facing peripheral walls of said bevel gears 11, 12. First and second pinions 17, 18 are respectively concentrically fitted to the outer side wall of the corresponding bevel gear 11, 12. These pinions 17, 18 are rotatably fitted to the main shaft 3 by means of corresponding bearings 15, 16, thereby ensuring their joint rotation with said bevel gears 11, 12. An auxiliary shaft 21 is rotatably supported on the main shaft 3 by means of bearings 19, 20 and is positioned between the first and second bevel gears 11, 12. The auxiliary shaft 21 is perpendicular to the main shaft 3. Provided near the other end of said auxiliary shaft 21 is a third bevel gear 22, which rotates about the auxiliary shaft 21, namely about the axis perpendicularly intersecting the main shaft 3, by means of corresponding bearings 23, 24. The third bevel gear 22 is meshed with the mutually facing sides of the first and second bevel gears 11, 12. Fixed to the side wall of said third bevel gear 22 is the proximal end of the aforementioned finger member 5 which extends perpendicular to the rotation axis of said third bevel gear 22.

Figure 2:
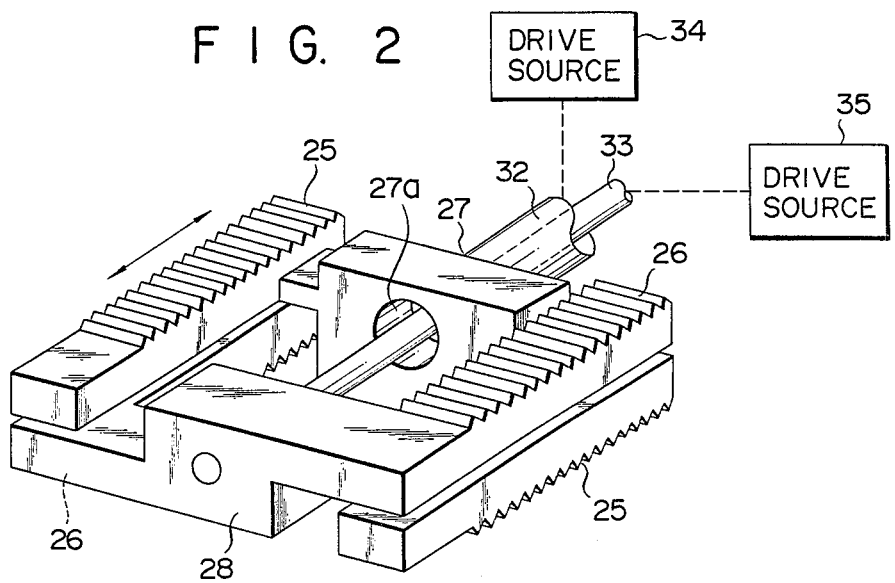
FIG. 2 is an oblique view of a gear drive mechanism used with the robot hand shown in FIG. 1B.

A description may now be made of the gear-driving mechanism for rotating the first and second pinions 17, 18. These pinions 17, 18 are meshed with the corresponding first and second racks 25, 26. These racks 25, 26 are reciprocated so as to be perpendicular and to intersect the main shaft 3. These racks 25, 26 are constructed as shown in FIG. 2. The rack 25 meshed with the pinion 17 of the first finger member-driving mechanism 30 is formed on one plane of one of the parallel extending arms of a first U-shaped top member 27. The rack 25, meshed with the pinion 17 of the second finger member-driving mechanism 31, is formed on the opposite plane of the other of said parallel extending arms. Similarly, the rack 26, meshed with the pinion 18 of the first finger-driving mechanism 30, is formed on the plane of one of the arms of a second U-shaped top member 28. The rack 26 meshed with the pinion 18 of the second finger-member driving mechanism 31 is formed on the opposite plane of the other of said parallel extending arms. The first and second gear-driving mechanisms are arranged in such a manner that the first pinion 17 of the first finger-driving mechanism 30 is made to face the second pinion 18 of the second finger-driving mechanism 31, and so that the second pinion 18 of the first finger-driving mechanism 30 is made to face the first pinion 17 of the second finger-driving mechanism 31. The first top member 27 and second top member 28 are independently reciprocated in the direction of the arrows shown in FIG. 2 in such a manner that the racks of said top members 27, 28 are turned outward and that the intermediate portions of said top members 27, 28 face each other. A penetrating hole 27a is provided in the intermediate part of the first top member 27. A drive tube 32 concentrically extending with said penetrating hole 27a is connected to said intermediate part. Connected to the intermediate part of the second top member 28 is one end of a drive rod 33, which extends through said penetrating hole 27a and drive tube 32. The drive tube 32 and drive rod 33 are connected at the other end to the known drive sources 34, 35, for example, to linear actuators. These drive sources 34, 35 cause the first and second top members 27, 28 to reciprocate by means of the drive tube 32 and drive rod 33. As a result, the first pinions 17 of the first and second drive mechanisms 30, 31 are simultaneously rotated in opposite directions by the first drive source 34. Similarly, the second pinions 18 of said first and second drive mechanisms 30, 31 are simultaneously rotated in opposite directions.

Figure 3A:
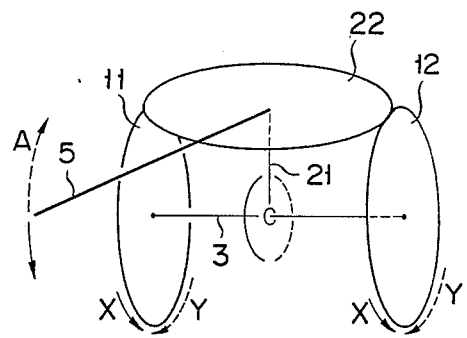
FIGS. 3A and 3B are views which illustrate the principle by which the robot hand of the invention is operated.
Figure 3B:
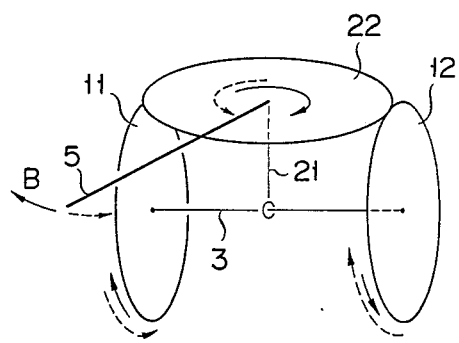

A description may now be made with reference to FIGS. 3A and 3B of the fundamental action of the finger member-driving mechanism constructed as described above. With the foregoing embodiment, the respective rotation-effecting mechanisms are formed of a pair of racks which enable the pinions of the first and second finger member-driving mechanisms to roll on said racks. However, it is possible to let the pinions be rotated independently. The following description refers to this case.

As shown in FIG. 3A, when the first and second bevel gears 11, 12 are rotated in the same direction (X-direction or Y-direction), rotation forces transmitted to a third bevel gear 22 from the first and second bevel gears 11, 12 act in the opposite direction, thereby preventing the third bevel gear 22 from being rotated. In spite of this fact, the first and second bevel gears 11, 12 still continue to rotate. Therefore, said third bevel gear 22 revolves around the aforementioned main shaft 3 while being meshed with the first and second bevel gears 11, 12. Thus, the finger members are rotated about the main shaft 3 in the direction indicated by arrow A, namely, in a vertical direction, to pinch a workpiece.

When, as shown in FIG. 3B, the first and second bevel gears 11, 12 are rotated in the opposite directions, the third bevel gear 22 is rotated about the auxiliary shaft 21 in a direction corresponding to the manner in which said first and second bevel gears 11, 12 are jointly rotated in the opposite directions. When, in this case, the first and second bevel gears 11, 12 are rotated at the same angle, the auxiliary shaft 21 is prevented from being rotated, thereby causing the finger members fitted to the third bevel gear 22 to be rotated back and forth as indicated by arrow B shown in FIG. 3B.

When the first and second bevel gears 11, 12 are rotated at different angles, the auxiliary shaft 21 and third bevel gear 22 are rotated in a manner corresponding to said different rotation angles. Namely, the third bevel gear revolves around the main shaft 3 and also rotates about its own axis. Consequently, the paired finger members 5, 6 can jointly make a composite action. This composite action of the finger members 5, 6 makes it possible to carry out more flexible and delicate work than the conventional work which relies only on the rotation of the wrist of the robot hand.

Figure 4:
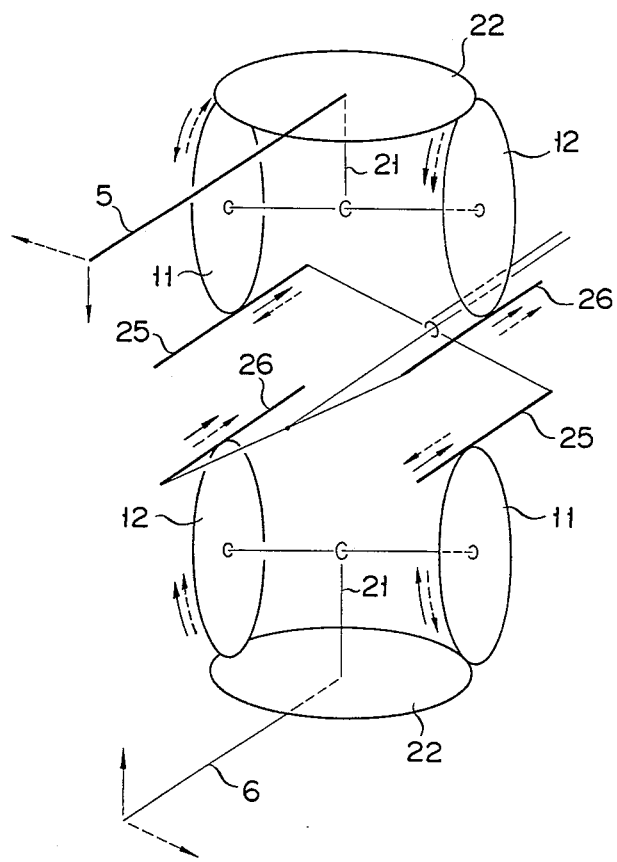
FIG. 4 also indicates the principle on which the operation of the subject robot hand is based.

FIG. 4 indicates the driven condition of the various members of the subject robot hand provided with the rotation-effecting mechanism shown in FIG. 2. The drive of said various members is related to the operation of the first finger member-driving mechanism 30 and second finger member-driving mechanism 31, which was previously described with reference to FIGS. 3A and 3B, a further description of said operation being omitted.

With the foregoing embodiment, the gear-driving mechanism is arranged so that the first and second pinions 17, 18 provided for each of said first and second finger member-driving mechanisms 30, 31 are rotated at the same time. As seen from the description of FIGS. 3A and 3B, however, it is possible to design the gear-driving mechanism so as to cause the respective pinions 17, 18 to be independently rotated. The foregoing embodiment refers to the case where the first and second pinions 17, 18 were formed independently of the first and second bevel gears. However, it is possible to provide said first and second pinions 17, 18 integrally with said first and second bevel gears 11, 12. Further, it is possible to replace the rack-pinion assembly by, for example, an assembly of spur gears. It is also possible to completely dispense with the pinion, and to design the gear-driving mechanism so as to directly rotate the first and second bevel gears 11, 12.

What is claimed is:

1. A robot hand comprising:
a robot hand body;
first and second parallel main shafts fixed to said robot hand body;
first and second finger member-driving mechanisms respectively provided on said first and second main shafts to face each other, each finger member-driving mechanism including first and second bevel gears separately set and rotatably supported on the main shaft, an auxiliary shaft rotatably supported on the main shaft, and a third bevel gear supported on said auxiliary shaft to be rotated about an axis perpendicularly intersecting the main shaft and meshed with both first and second bevel gears;
a finger member fixed to said third bevel gear; and
drive means for rotating said first and second bevel gears.

2. The robot hand according to claim 1, wherein the first and second bevel gears are respectively provided with pinions, and said drive means for the first and second bevel gears includes gears meshed with the pinions for their rotation.

3. The robot hand according to claim 2, wherein said drive means respectively comprises a first gear-driving mechanism for simultaneously moving the gears meshed with the pinions provided for the first bevel gears of both first and second finger member-driving mechanisms; a second gear-driving mechanism for simultaneously moving the gears meshed with the pinion provided for the second bevel gears of both first and second finger member-driving mechanisms; and first and second drive sources for actuating said first and second gear-driving mechanisms.

4. The robot hand according to claim 3, wherein said first gear-driving mechanism comprises a first U-shaped reciprocative top member having a pair of parallel extending arms, said gears meshed with the pinions provided for the first bevel gears of the first and second finger member-driving mechanisms including racks formed on one plane of one of said paired arms and on the opposite plane of the other of said paired arms being provided with a rack meshed with the pinion provided for the first bevel gear of the second finger member-driving mechanism; wherein said first drive source effects the reciprocation of said first top member; wherein said second gear-driving mechanism comprises a second U-shaped reciprocating top member having a pair of parallel extending arms, said gears meshed with the pinions provided for the second bevel gears of the first and second finger member-driving mechanisms including racks formed on one plane of said paired arms and on the opposite plane of the other of said paired arms being provided with a rack meshed with the pinion provided; and wherein said second drive source effects the reciprocation of said second top member.

* * * * *